United States Patent
Krebs et al.

(10) Patent No.: US 9,784,264 B2
(45) Date of Patent: Oct. 10, 2017

(54) PUMP ASSEMBLY

(71) Applicant: Continental Teves AG & Co. oHG, Frankfurt (DE)

(72) Inventors: Stephan Krebs, Eschborn (DE); Jens Bacher, Frankfurt am Main (DE); Heinrich Kreh, Florstadt (DE); Lazar Milisic, Kelkheim/Taunus (DE); Michael Jürging, Kelkheim (DE); Marcel Niepenberg, Meinhard-Hitzelrode (DE); Jose Gonzalez, Bad Oeynhausen (DE); Karlheinz Seitz, Lorsch (DE); Hans-Michael Koppel, Frankfurt (DE); Falk Petzold, Frankfurt am Main (DE); Rolf Fellinger, Dreikirchen (DE); Thomas Oeffner, Karben (DE); Paul Wiebe, Weiterstadt (DE); Stefan Imhof, Oberursel (DE); Manfred Rüffer, Sulzbach (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 90 days.

(21) Appl. No.: 14/784,451

(22) PCT Filed: Apr. 25, 2014

(86) PCT No.: PCT/EP2014/058447
§ 371 (c)(1),
(2) Date: Oct. 14, 2015

(87) PCT Pub. No.: WO2014/174072
PCT Pub. Date: Oct. 30, 2014

(65) Prior Publication Data
US 2016/0102662 A1    Apr. 14, 2016

(30) Foreign Application Priority Data
Apr. 26, 2013    (DE) .................. 10 2013 207 741

(51) Int. Cl.
*F01B 1/02*    (2006.01)
*F04B 45/04*    (2006.01)
(Continued)

(52) U.S. Cl.
CPC .............. *F04B 45/04* (2013.01); *B60T 13/52* (2013.01); *F04B 9/045* (2013.01); *F04B 45/043* (2013.01);
(Continued)

(58) Field of Classification Search
CPC ........ F04B 45/04; F04B 9/045; F04B 45/043; F04B 45/047; F04B 53/006
(Continued)

(56) References Cited

U.S. PATENT DOCUMENTS 5,558,507 A * 9/1996 Magnus ................ F04B 43/082
                                                    29/888.022
8,585,372 B2   11/2013 Bacher
(Continued)

FOREIGN PATENT DOCUMENTS

DE    2543300    2/1977
DE    9205733    10/1993
(Continued)

OTHER PUBLICATIONS

German Search Report for German Application No. 10 2013 207 741.6 dated Dec. 11, 2013, including partial translation.
(Continued)

*Primary Examiner* — Michael Leslie
*Assistant Examiner* — Daniel Collins
(74) *Attorney, Agent, or Firm* — RatnerPrestia

(57) ABSTRACT

A pump assembly for supplying negative pressure to a pneumatic brake booster, wherein the pump assembly has at least two elastic displacement elements which are moved by connecting rods, the connecting rods each being rotatably mounted on an eccentric element. The eccentric element has a bearing seat element and a force element. At least two eccentric elements are secured next to each other on a drive shaft that rotates about an axis of rotation and an interlocking anti-rotation device is provided that determines a defined angular position of the eccentric elements relative to each other about the axis of rotation. In order to improve the ease of assembly and simplify the manufacturability, the anti-rotation device is designed as shaped elements of the bearing seat element in such a way that they engage in each other in an interlocking manner when the eccentric elements are in a defined angular position relative to each other.

11 Claims, 5 Drawing Sheets

(51) Int. Cl.
| | |
|---|---|
| F04B 9/04 | (2006.01) |
| F04B 45/047 | (2006.01) |
| B60T 13/52 | (2006.01) |
| F04B 53/00 | (2006.01) |
| F04B 53/16 | (2006.01) |
| F16C 3/18 | (2006.01) |
| F16C 3/20 | (2006.01) |

(52) U.S. Cl.
CPC .......... *F04B 45/047* (2013.01); *F04B 53/006* (2013.01); *F04B 53/16* (2013.01); *F16C 3/18* (2013.01); *F16C 3/20* (2013.01)

(58) Field of Classification Search
USPC ............................................................ 92/74
See application file for complete search history.

(56) References Cited

U.S. PATENT DOCUMENTS

| 8,926,293 | B2 | 1/2015 | Ruffer | |
|---|---|---|---|---|
| 2010/0202893 | A1 | 8/2010 | Bacher | |
| 2011/0271670 | A1* | 11/2011 | Krebs | ..................... B60T 17/02 60/533 |
| 2012/0070323 | A1* | 3/2012 | Felber | ................... F04B 45/047 417/413.1 |
| 2012/0269664 | A1 | 10/2012 | Ruffer | |

FOREIGN PATENT DOCUMENTS

| DE | 29723455 | 10/1998 |
|---|---|---|
| DE | 102008005820 | 3/2009 |
| DE | 102009054502 | 6/2010 |
| DE | 102011006525 | 10/2012 |
| EP | 1953387 | 8/2008 |
| WO | 2011073318 | 6/2011 |

OTHER PUBLICATIONS

International Search Report for International Application No. PCT/EP2014/058447 dated Aug. 4, 2014.

\* cited by examiner

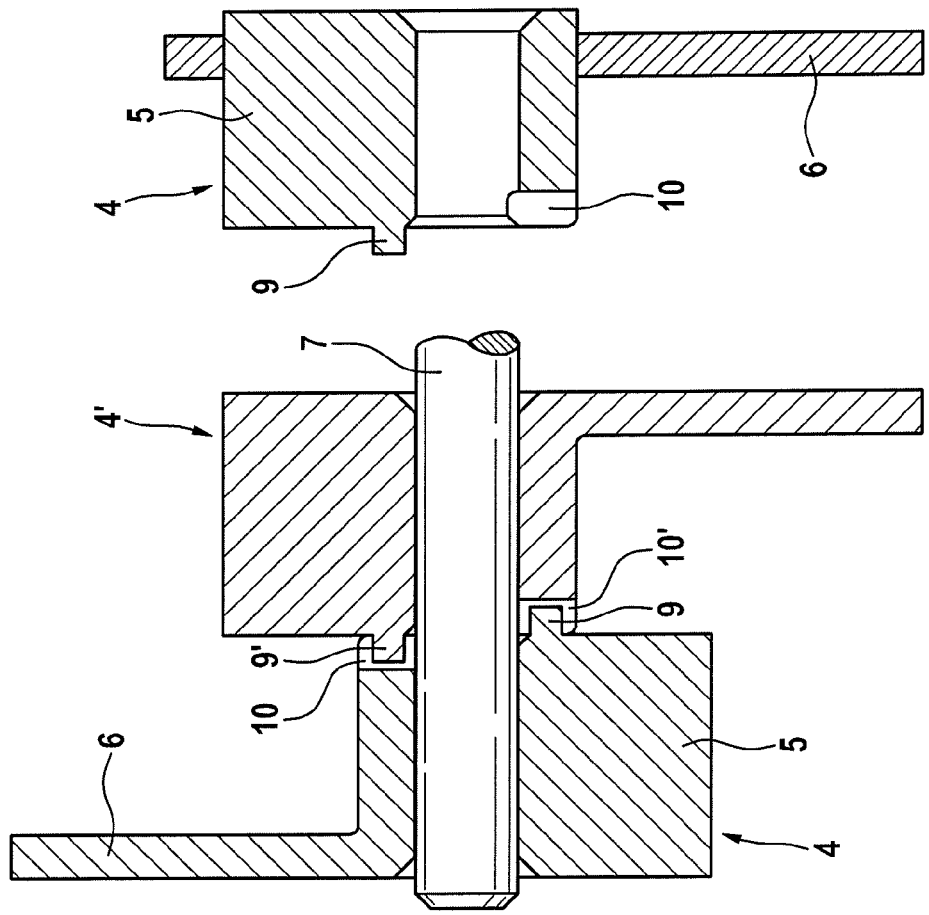
Fig. 5
Fig. 4
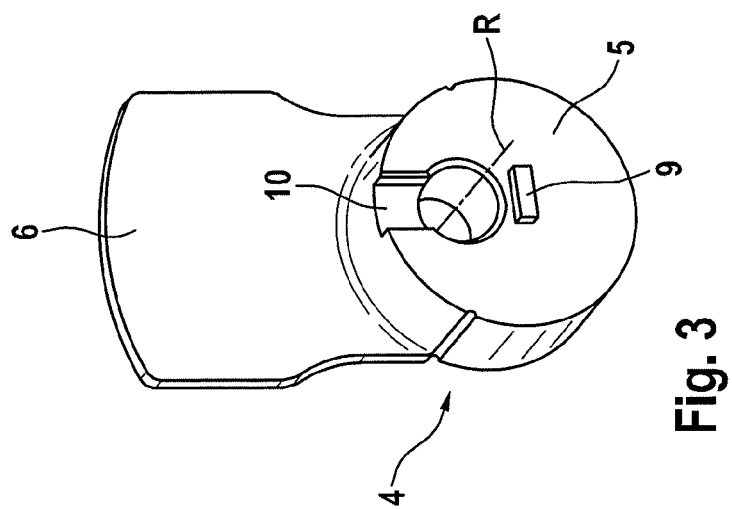
Fig. 3

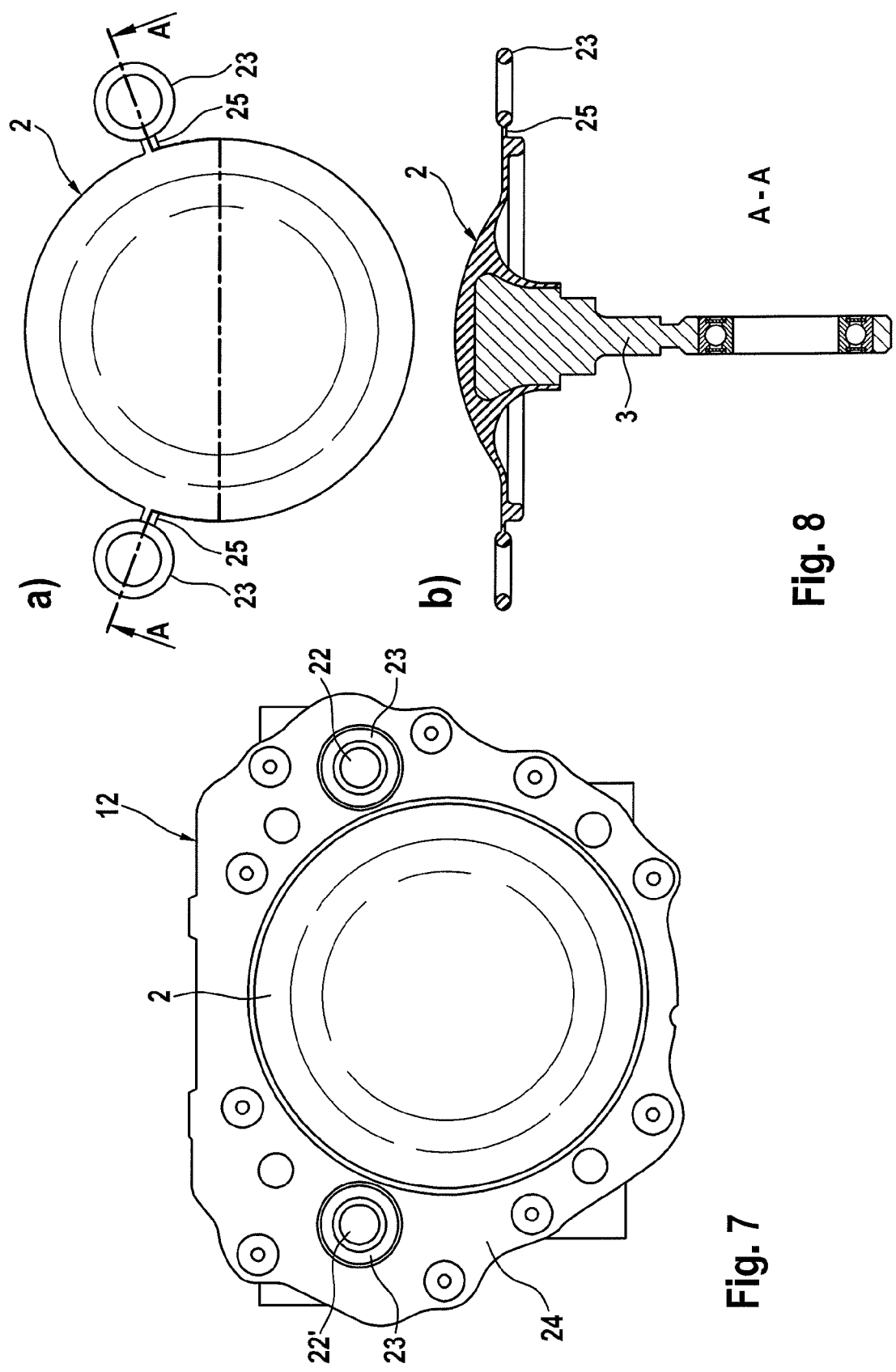

PUMP ASSEMBLY

CROSS REFERENCE TO RELATED APPLICATIONS

This application is the US National Phase Application of PCT International Application No. PCT/EP2014/058447, filed Apr. 25, 2014, which claims the priority to German Patent Application No. 10 2013 207 741.6, filed Apr. 26, 2013, the contents of such applications being incorporated by reference herein.

FIELD OF THE INVENTION

The invention relates to a pump assembly in particular for the supply of negative pressure to a pneumatic brake booster.

BACKGROUND OF THE INVENTION

Pump assemblies for use in a motor vehicle for the purposes of assistively or exclusively supplying negative pressure to a pneumatic brake booster are basically known.

For example, dual-diaphragm pump assemblies are known which have an electric-motor drive, a crank mechanism which comprises two eccentric elements, and two elastic displacement elements which can be driven by the crank mechanism. To ensure an intended sequence of movements of the displacement elements over time, the crank mechanism has relative-rotation prevention means which prevent a rotation of eccentric elements relative to one another and ensure a defined rotational angle position of the eccentric elements relative to one another. It is known for such relative-rotation prevention means to be realized by way of two clamping pins which engage simultaneously into corresponding bores of two adjacent eccentric elements and thereby prevent the rotation of said eccentric elements relative to one another.

To ensure operation of the pump assembly with a low level of vibration, it is furthermore known for the eccentric elements to be equipped with balancing elements which serve as compensating weights on the crank mechanism and which reduce vibrations during operation. For example, it is known for the eccentric elements to be produced integrally with the balancing elements in a sintering process.

Likewise known are pump assemblies of the generic type mentioned in the introduction which have air ducts integrated in the pump housing, said air ducts having an interface in the plane of the displacement element. It is known for said interfaces to be sealed off by way of separate sealing elements such as O-rings. The expenditure in terms of the production and assembly of the pump assemblies mentioned in the introduction is considered to have potential for improvement.

SUMMARY OF THE INVENTION

A problem addressed by an aspect of the present invention is therefore that of specifying a pump assembly which involves less outlay in terms of assembly, and is easier to produce, in relation to the prior art mentioned in the introduction.

By virtue of the fact that, according to an aspect of the invention, the relative-rotation prevention means are in the form of integrated shaped elements of the bearing seat element, such that said relative-rotation prevention means engage into one another in form-fitting fashion in a defined rotational angle position of eccentric elements relative to one another, additional centering or clamping pins for the prevention of relative rotation, and the assembly operations required for installing such pins, are omitted.

In one advantageous embodiment, the bearing seat element may have at least one projection and at least one indentation, which are arranged on the bearing seat element such that, in a defined rotational angle position of two eccentric elements relative to one another, a projection of one bearing seat element engages in form-fitting fashion into an indentation of the other bearing seat element, and in this way a relative-rotation prevention function is realized in an effective and simple manner. Furthermore, unique positioning of the eccentric elements relative to one another is ensured in a simple manner without further components, and assembly errors and the number of interfaces and tolerance chains are advantageously reduced.

The projection and the indentation may preferably have an interference fit. In this way, a degree of play in the assembly of two eccentric elements is avoided in a particularly effective manner, impact loading of the relative-rotation prevention means and noise emissions during the operation of the pump assembly are reduced, and the durability of the crank mechanism is increased.

In an advantageous refinement of the invention, the projection and the indentation may each have a substantially cuboidal basic form. In a further advantageous refinement, the indentation may be formed so as to extend from the axial bore in a radial direction in the manner of a groove to a radial outer contour of the bearing seat element. The production of the indentation is simplified in this way, furthermore, the open groove form promotes a self-cleaning action, and a risk of accumulation of foreign bodies in the indentation, which can impede or prevent correct assembly of eccentric elements, is reduced in an effective manner.

In another advantageous embodiment according to the invention, the balancing element may be provided in a manner fastened in force-fitting fashion to the bearing seat element; in particular, the balancing element may have an aperture which receives the bearing seat element in force-fitting fashion by way of a clamping fit or press fit. In this way, it is possible for both the bearing seat element and the balancing element to be produced individually in an effective manner from expedient semifinished parts. For example, the bearing seat element may be cut from a bar, and the balancing element may be punched out of a flat strip.

It is furthermore advantageously possible for the bearing seat element to be pressed or shrink-fitted into the aperture in a simple and effective manner, such that no additional form-fitting or cohesive fastening aids, such as screws or weld spots, are necessary.

It is advantageously possible for the eccentric elements according to the invention to be of identical design, and thus for the manufacturing outlay to be reduced through the use of multiple identical components in one pump assembly.

In another embodiment according to the invention of the pump assembly, having a pump housing which has at least one integrated air duct, at least one displacement element may advantageously have means for sealing off the air duct; in particular, one or more sealing elements may be embodied in a manner formed integrally on the displacement element. In this way, separate assembly processes for the installation of individual sealing elements are dispensed with, and expensive and safety-relevant assembly errors, such as for example omission or incorrect positioning of sealing elements, can be reduced in an effective manner.

BRIEF DESCRIPTION OF THE DRAWINGS

Further details, features, advantages and possible uses of the invention will emerge from the subclaims together with the description on the basis of the drawings. Corresponding components and structural elements will, where possible, be denoted by the same reference signs. In the drawings:

FIG. 3 shows an embodiment according to the invention of an eccentric element in a three-dimensional illustration.

FIG. 4 is a sectional illustration of two eccentric elements corresponding to the embodiment as per FIG. 3, in a mounted state on a drive shaft.

FIG. 5 shows a further embodiment according to the invention of an eccentric element in a sectional illustration.

FIG. 7 shows a plan view of a pump housing with a known displacement element inserted therein.

FIG. 8 shows an embodiment according to the invention of the displacement element in a plan view (a) and in a sectional illustration (b).

DETAILED DESCRIPTION OF THE PREFERRED EMBODIMENTS

FIG. 1

Figure 2:
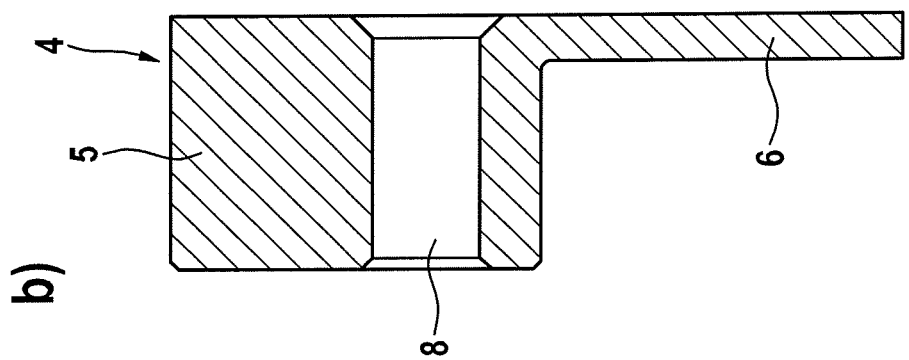
FIG. 2 shows a known eccentric element in a three-dimensional illustration (a) and a sectional illustration (b).
Figure 2:
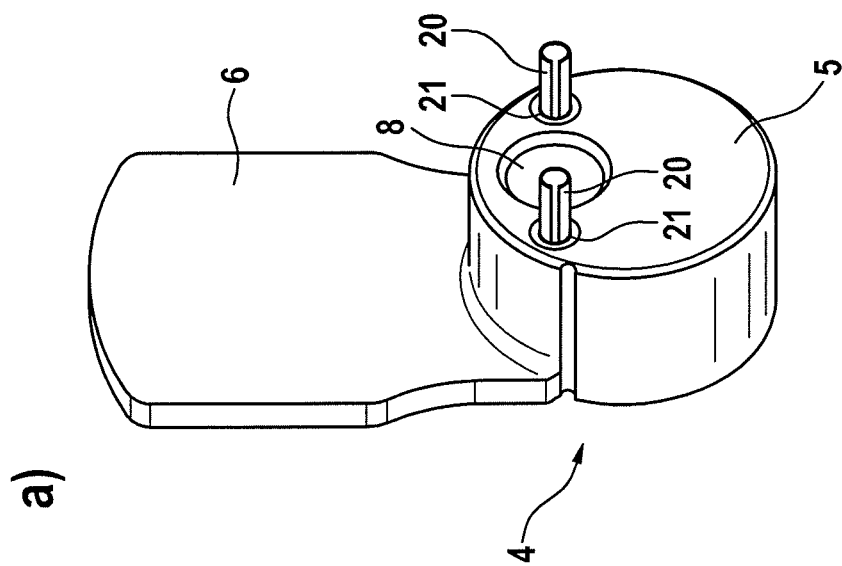
Figure 6:
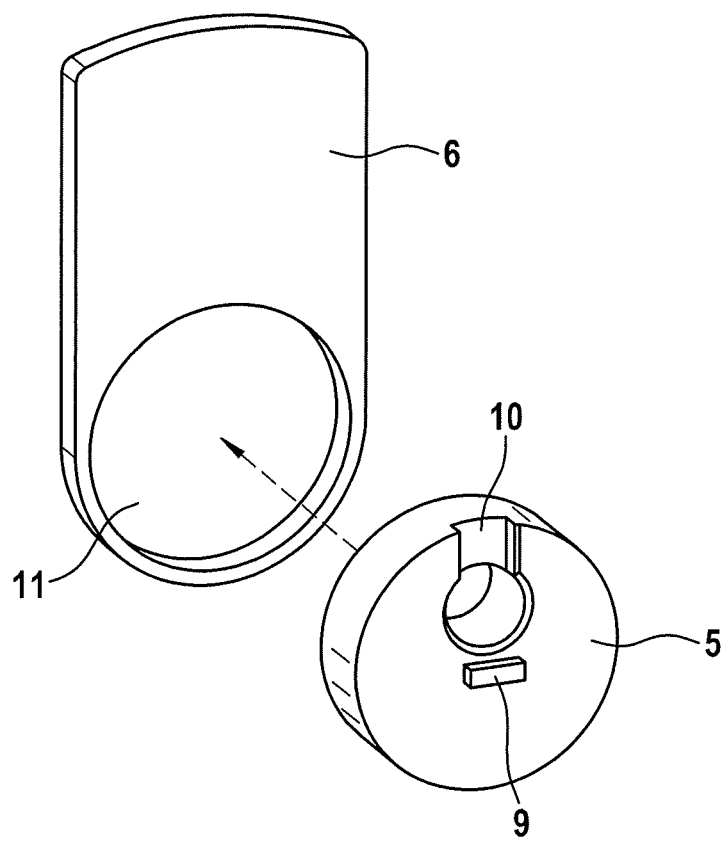
FIG. 6 shows an embodiment of an eccentric element corresponding to FIG. 5 in an exploded illustration.

A known pump assembly 1 has a pump housing 12 and an electric drive 13 which, via the drive shaft 7, sets a crank mechanism 14 in motion. Two eccentric elements 4, 4' are arranged adjacent to one another on the drive shaft 7 and substantially each have a substantially cylindrical mounting element 4 and, adjoining the mounting element 4 or 4' at one side, a balancing element 5 or 5'. The central points of the two mounting elements 4, 4' are arranged so as to be offset relative to one another about the axis of rotation R by a rotational angle of 180°. To permanently maintain said defined rotational angle position of the two eccentric elements relative to one another, the eccentric elements have relative-rotation prevention means, which will be described in FIG. 2. The crank mechanism 14 has two connecting rods 3, 3' which are each fastened rotatably on the bearing seat elements 5, 5' by way of the ball bearings 15, 15'. The connecting rods 3, 3' end in the elastic displacement elements 2, 2'. The displacement elements 2, 2' are braced in air-tight fashion between the pump housing 12 and in each case one working chamber cover 16, 16', and thus each delimit a working chamber 17, 17'.

The rotation of the drive shaft 7 about the axis of rotation R causes the displacement elements 2, 2' to be set in translational motion, such that the volume of the two working chambers 17, 17' is alternately increased and decreased in size, and thus the air is, via a check valve arrangement 18, 18' with the associated ducts, drawn through a vacuum line 19 from a pneumatic brake booster (not shown) into the working chambers 17, 17' and subsequently discharged into the surroundings.

The offset of eccentric elements 4, 4' by the rotational angle of 180° relative to one another has the effect that the top dead center of the connecting rod 3 coincides with the bottom dead center of the connecting rod 3', and vice versa. It is ensured in this way that the drawing of the air into and discharging of the air out of the working chambers 17, 17' never take place simultaneously, and the load on the drive 13 is distributed as uniformly as possible, whereby imbalances and vibrations of the pump assembly are reduced. A further reduction of imbalances and vibrations is realized by way of balancing elements 6, 6' of the eccentric elements 4, 4', which balancing elements compensate a mass offset which arises owing to an arrangement of the central points of the bearing seat elements 5, 5' adjacent to the axis of rotation R.

FIGS. 2A-2B

Figure 1:
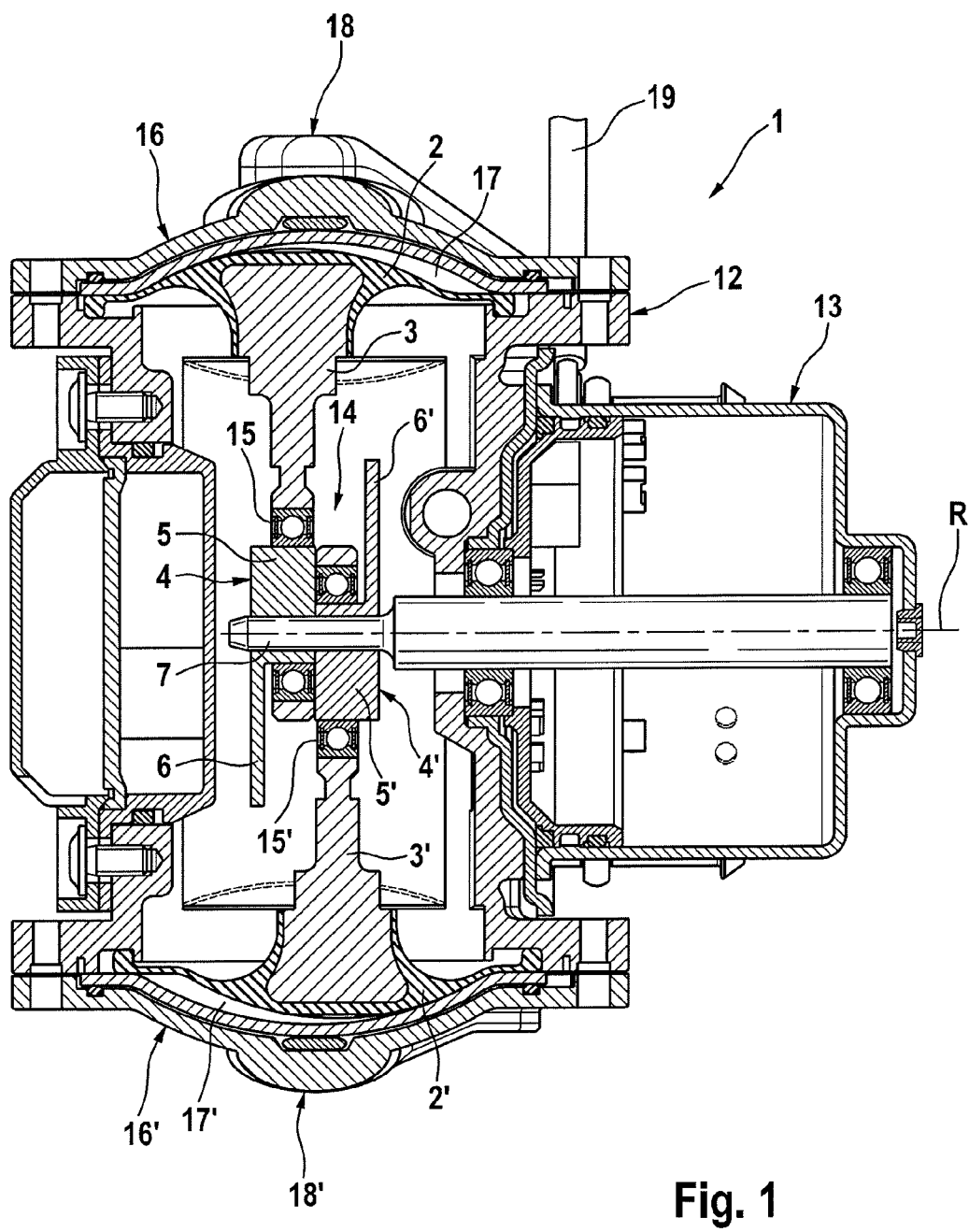
FIG. 1 shows a known pump assembly of the generic type mentioned in the introduction in a cross section.

FIGS. 2A-2B show an eccentric element 4, as already shown in FIG. 1, in a three-dimensional view and in a sectional illustration. The eccentric element 4 is produced integrally with its bearing seat element 5 and the balancing element 6 in a sintering process. An axial bore 8 extends through the bearing seat element 5 and serves for the guidance and fastening of the eccentric element 4 on the drive shaft 7. For the prevention of relative rotation of two adjacent eccentric elements with respect to one another, two clamping pins 20 are provided which are inserted into the pin bores 21. When two eccentric elements are positioned on the drive shaft in a certain structurally predefined rotational angle position relative to one another about the axis of rotation R, the pin bores 21 are in alignment, and the clamping pins 20 inserted therein secure the eccentric elements in form-fitting fashion so as to prevent an undesired change of the relative rotational angle position.

FIG. 3

FIG. 3 shows a first embodiment according to the invention of an eccentric element 4. The bearing seat element 5 is likewise formed integrally with the balancing element 6, but it is the case here that, for the prevention of relative rotation, the bearing seat element 5 has not the bores and pins, which are cumbersome to produce and assemble, but in each case one projection 9 and one indentation 10, which are formed, as integral shaped elements of the bearing seat element 5, so as to be offset about the axis of rotation R by 180°.

The indentation 10 preferably extends in a radial direction from the axial bore 8 to the radial outer contour of the bearing seat element 5, whereby the indentation is of a groove-shaped form which is easy to produce.

FIG. 4

As can be seen in particular from FIG. 4, which shows two eccentric elements 4, 4' mounted on the drive shaft 7, a projection 9 of the eccentric 4 engages into an indentation 10' of the eccentric 4', and the projection 9' simultaneously engages into the indentation 10. This gives rise to a form-fitting relative-rotation prevention action between the two eccentric elements 4 and 4'. Furthermore, unique positioning is simplified. Since both the projection 9 and the indentation 10 are in the form of integrated shaped elements, it is the case, by contrast to the known embodiment as per FIG. 2, that additional parts such as clamping pins 20, and additional assembly operations for the installation of the pins 20, are not necessary. Furthermore, the two eccentric elements 4, 4' according to the invention can be of identical design.

As already shown in FIG. 3, both the projection 9 and the indentation 10 have a substantially cuboidal basic form. The individual dimensions may preferably be configured such that said projection and indentation have a press fit when they engage into one another. In this way, play in the relative-rotation prevention means can be avoided, and the durability, precision and efficiency of the crank mechanism are increased.

It is self-evidently possible within the scope of the invention also for a different number of projections and indentations, and different basic forms of projections and indentations, to be realized. It is likewise conceivable for a rotational angle offset that differs from 180° to be realized between an indentation and a projection, whereby a specific movement sequence of the displacement elements 2, 2' can be realized which differs from that described above.

FIG. 5

FIG. 5 shows a further embodiment according to the invention of an eccentric element 4. By contrast to the eccentric element 4 as per FIGS. 3 and 4, the eccentric element 4 in FIG. 5 is of two-part form and has a balancing element 6 which can be produced separately from the bearing seat element 5 and mounted on the latter at a later point in time. In this way, the bearing seat element 5 can be easily produced from round bar steel, and, for the ball bearing or another form of radial bearing of the connecting rod 3, can be inexpensively calibrated by deformation rather than being subjected to a cutting turning process. The balancing element 6 may likewise be punched, mechanically cut or laser-cut from a flat starting material in a particularly simple and inexpensive manner. Expensive sintering molds, along with the cumbersome, energy-intensive and expensive sintering process, are avoided.

FIG. 6

The balancing element 6 known from FIG. 5 is fastened in force-fitting fashion to the bearing seat element 5. For this purpose, the balancing element 6 has an aperture 11. The diameter of the aperture 11 is preferably configured for a press fit, in order that the bearing seat element 5 can be pressed or shrink-fitted into the aperture 11 and the balancing element 6 remains permanently and in the original position on the bearing seat element in all intended operating states.

FIG. 7

FIG. 7 shows a plan view of a pump housing 12; here, the working chamber cover 16 has been dismounted and is not shown. The pump housing has two integrated air ducts 22, 22', wherein one of the ducts serves as a pneumatic connection from the pneumatic brake booster (not shown) to the working chamber 17, and the other air duct is suitable for discharging the air from the working chamber 17 into the interior of the pump housing 12 or into the surroundings.

The two air ducts 22, 22' are sealed off by way of sealing elements 23, by virtue of said sealing elements, in the region of the flange 24 of the pump housing 12, being compressed by a corresponding flange of the working chamber cover 16 in the assembled state of the pump assembly 1.

FIGS. 8A-8B

FIGS. 8A-8B show an embodiment according to the invention of a displacement element 2. By contrast to the known embodiment described above, the two sealing elements 23 are formed integrally on the displacement element 2 by way of webs 25, whereby the displacement element 2 is formed integrally with the sealing elements 23.

Within the scope of the invention, it is however conceivable, if required, and depending on the specific application, for not two but only one or even more sealing elements to be formed integrally on the displacement element. Likewise, the shape of the sealing elements 23 may differ in any desired manner from that shown, without departing from the scope of the invention.

REFERENCE SIGNS

1 Pump assembly
2, 2' Displacement element
3, 3' Connecting rod
4, 4' Eccentric element
5, 5' Bearing seat element
6, 6' Balancing element
7 Drive shaft
8 Axial bore
9 Projection
10 Indentation
11 Aperture
12 Pump housing
13 Electric drive
14 Crank mechanism
15, 15' Ball bearing
16, 16' Working chamber cover
17, 17' Working chamber
18 Check valve arrangement
19 Vacuum line
20 Clamping pin
21 Pin bore
22 Air duct
23 Sealing element
24 Flange
25 Web
R Axis of rotation

The invention claimed is:

1. A pump assembly having a pump housing, for the supply of negative pressure to a pneumatic brake booster, wherein the pump assembly has at least two elastic displacement elements which are moved by connecting rods, wherein the connecting rods are each rotatably mounted on an eccentric element, wherein the eccentric elements each have a bearing seat element and a balancing element, wherein at least two eccentric elements are fixed, adjacent to one another, to a drive shaft which rotates about an axis of rotation, each bearing seat element having an axial bore which extends through the bearing seat element along the axis of rotation, and form-fitting relative-rotation prevention means are provided which fix a defined rotational angle position of the eccentric elements with respect to one another about the axis of rotation, wherein the relative-rotation prevention means are in the form of at least one projection and at least one indentation formed on the bearing seat element, such that said relative-rotation prevention means engage into one another in form-fitting fashion in a defined rotational angle position of eccentric elements relative to one another, wherein the indentation is formed so as to extend in a radial direction from the axial bore to an outer radial edge of the bearing seat element.

2. The pump assembly as claimed in claim 1, wherein in a defined rotational angle position of two eccentric elements relative to one another, the projection of one bearing seat element engages in form-fitting fashion into the indentation of the other bearing seat element.

3. The pump assembly as claimed in claim 2, wherein the projection and the indentation have an interference fit.

4. The pump assembly as claimed in claim 2, wherein the projection and the indentation each have a substantially cuboidal basic form.

5. The pump assembly as claimed in claim 1, wherein the balancing element is fastened in force-fitting fashion to the bearing seat element.

6. The pump assembly as claimed in claim 5, wherein the balancing element has an aperture, and the bearing seat element is arranged in force-fitting fashion in the aperture.

7. The pump assembly as claimed in claim 6, wherein the bearing seat element is pressed or shrink-fitted into the aperture.

8. The pump assembly as claimed in claim 1, wherein the eccentric elements are of identical design.

9. The pump assembly as claimed in claim 1, wherein the pump housing has at least one integrated air duct wherein at least one displacement element has means for sealing off the air duct.

10. The pump assembly as claimed in claim 9, wherein the displacement element is formed integrally with at least one sealing element for sealing off the air duct.

11. The pump assembly as claimed in claim 10, wherein the displacement element is formed integrally with two sealing elements for sealing off the air duct.

* * * * *